United States Patent
Blasko et al.

(10) Patent No.: US 9,225,172 B2
(45) Date of Patent: Dec. 29, 2015

(54) SYSTEMS AND METHODS FOR TUNING THE CONTROL OF A SHUNT ACTIVE POWER FILTER OVER A VARIABLE FREQUENCY

(71) Applicant: Hamilton Sundstrand Corporation, Charlotte, NC (US)

(72) Inventors: Vladimir Blasko, Avon, CT (US); Fernando Rodriguez, Manchester, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 187 days.

(21) Appl. No.: 13/923,807

(22) Filed: Jun. 21, 2013

(65) Prior Publication Data

US 2014/0376284 A1    Dec. 25, 2014

(51) Int. Cl.
*H02M 1/12* (2006.01)
*H02J 3/24* (2006.01)
*H02J 3/01* (2006.01)

(52) U.S. Cl.
CPC ... *H02J 3/24* (2013.01); *H02J 3/01* (2013.01); *Y02E 40/22* (2013.01)

(58) Field of Classification Search
CPC ............... H01L 2924/0002; H01L 2924/00; H01F 17/0006; H02M 3/3376; H02M 1/40; H02M 7/53871; H02J 3/24; H02J 1/00
USPC ............ 363/16–20, 34–41, 9, 97, 98; 307/64; 318/599, 696, 702
See application file for complete search history.

(56) References Cited

U.S. PATENT DOCUMENTS

| | | | | |
|---|---|---|---|---|
| 4,812,669 A | * | 3/1989 | Takeda et al. | 307/105 |
| 5,005,115 A | * | 4/1991 | Schauder | 363/159 |
| 5,225,741 A | * | 7/1993 | Auld et al. | 315/307 |
| 5,329,221 A | * | 7/1994 | Schauder | 323/207 |
| 5,465,203 A | * | 11/1995 | Bhattacharya et al. | 363/40 |

(Continued)

FOREIGN PATENT DOCUMENTS

| | | |
|---|---|---|
| EP | 0645866 A1 | 3/1995 |
| JP | 2013085435 A | 5/2013 |

OTHER PUBLICATIONS

European Search Report for related EP Application No. 14173260.2-1806, dated Oct. 30, 2014, pp. 1-6.

*Primary Examiner* — Rajnikant Patel
(74) *Attorney, Agent, or Firm* — Cantor Colburn LLP

(57) ABSTRACT

Embodiments relate to systems and methods for tuning the control of a shunt active power filter over a variable frequency. In aspects, a shunt active power filter is provided to filter current harmonics from the output delivered to a dc load via a rectifier. The shunt active power filter control can be configured as a set of resonant regulators connected in a parallel configuration. Each of the resonant regulators can be tuned to dampen or eliminate a particular harmonic, such as the 5th, $7^{th}$, $11^{th}$, $13^{th}$, $17^{th}$ or $19^{th}$ harmonics. The shunt active power filter can be configured to target those or other harmonics over a range of source voltage frequencies, such as 360-800 Hz. The harmonics can be tuned over that or other source frequency ranges by determining the root locus poles of the filter as a function of feedback loop gain.

16 Claims, 3 Drawing Sheets

(56) References Cited

U.S. PATENT DOCUMENTS

| | | | |
|---|---|---|---|
| 6,154,379 A * | 11/2000 | Okita | 363/40 |
| 6,166,929 A * | 12/2000 | Ma et al. | 363/37 |
| 7,088,971 B2 * | 8/2006 | Burgener et al. | 455/127.1 |
| 7,315,160 B2 * | 1/2008 | Fosler | 323/285 |
| 8,421,398 B2 * | 4/2013 | Fisher et al. | 318/806 |
| 2009/0102436 A1 | 4/2009 | Escobar et al. | |

* cited by examiner

SYSTEMS AND METHODS FOR TUNING THE CONTROL OF A SHUNT ACTIVE POWER FILTER OVER A VARIABLE FREQUENCY

FIELD

The present teachings relate to systems and methods for tuning the control of a shunt active power filter over a variable frequency, and more particularly, to platforms and techniques for tuning the harmonic values which are dampened in a shunt active power filter using selectable feedback gain over variable source frequencies.

BACKGROUND

In the field of power systems, it has been known to connect a rectifier to an alternating current (AC) power source to derive a direct current (DC) for motors or other loads. A rectifier connected to a 3-phase AC voltage source, however, generates undesired current harmonics, which can include at least the 5th, 7th, 11th, 13th, 17th, and $19^{th}$ harmonics, which can introduce noise and other artifacts in the power circuit.

To address that undesirable harmonic content, it has been known to use a shunt active power filter.

Moreover, the application of a shunt active power filter to a variable frequency system has not been demonstrated. In a shunt active power filter designed to operate on source voltages which are variable, such as between 360-800 Hz, the range and amplitude of potential harmonics of the source current can be significant. Providing a way to selectively tune to, and dampen, those harmonics has not been established.

It may be desirable to provide methods and systems for tuning the control of a shunt active power filter over a variable frequency, in which harmonics generated at any point over a range of power source frequencies can be selectively tuned-for and dampened to prevent spurious output voltages to loads.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for tuning the control of a shunt active power filter over a variable frequency. More particularly, embodiments relate to platforms and techniques for introducing a shunt active power filter to a power supply network. In aspects, the shunt active power filter can be configured to selectively target undesirable harmonics generated over a variable frequency range in an alternating power source. According to aspects, the shunt active power filter can employ a set of resonant regulators in a parallel or stacked arrangement, which each resonant regulator tuned to a particular harmonic over the desired or target frequency range of the power source.

Reference will now be made in detail to exemplary embodiments of the present teachings, which are illustrated in the accompanying drawings. Where possible the same reference numbers will be used throughout the drawings to refer to the same or like parts.

Figure 1:
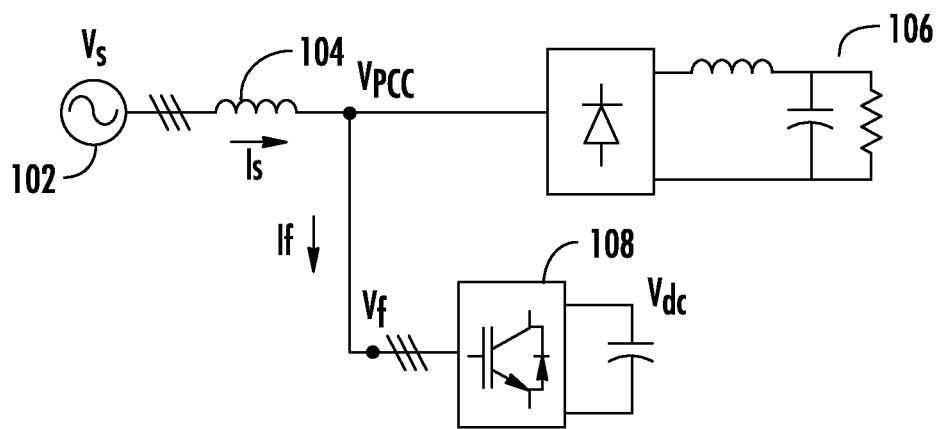
FIG. 1 illustrates a shunt active power filter, according to various embodiments.

FIG. 1 illustrates an overall shunt active power filter system 100 which can be used as a component in which systems and methods for tuning the control of a shunt active power filter over a variable frequency can operate, according to aspects. In aspects as shown, the system 100 can generally include a voltage source 102 coupled to an inductor element 104 through which a source current ($I_S$) flows. In implementations, the voltage source 102 can be or include a three-phase voltage or other power source. The voltage source can be coupled at voltage Vpcc to a load 106 and a network 108 to produce filtering effects. The load 106 can receive a load current ($I_L$), and as shown, include a set of inductive, resistive, and capacitive elements to permit tuneability or adjustability to various frequencies. The network 108 can receive a filter current (If) and provide an output voltage (Vdc) which can be supplied to the load 106, such as a motorized load or other load. In implementations, two or more elements similar to that of system 100 can be incorporated in an overall shunt active power filter having multiple tuned frequencies, to permit the selective damping of particular harmonics and/or frequencies.

Figure 2:
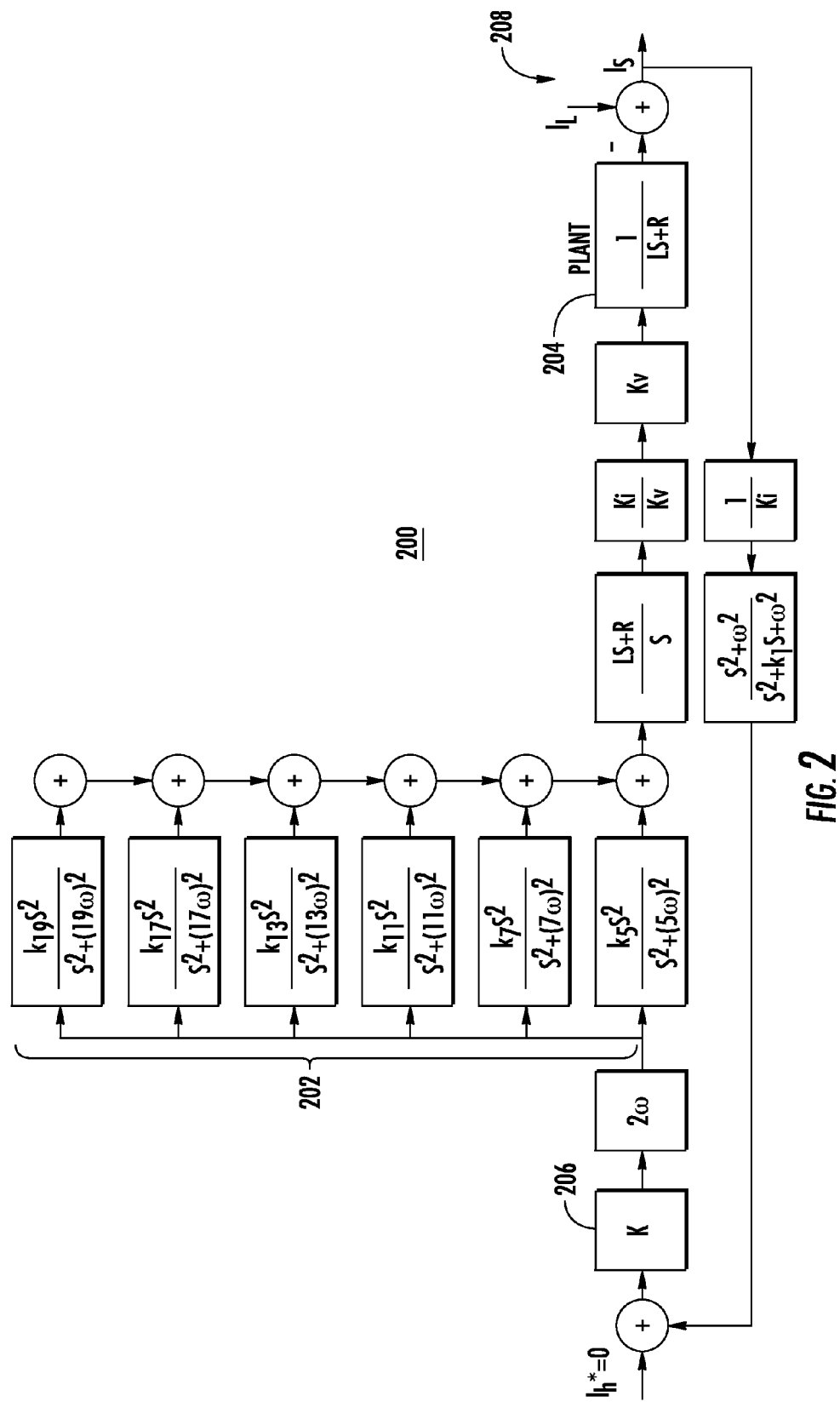
FIG. 2 illustrates an overall active power filter system consistent with systems and methods for tuning the control of a shunt active power filter over a variable frequency, according to various embodiments.

More specifically and as for instance illustrated in FIG. 2, an overall system 200 according to aspects of the present teachings can receive a source voltage (not shown), and couple the source voltage and/or current to a set of resonant regulators 202. Each of the set of resonant regulators can be configured to operate at a particular harmonic of the source voltage or current. In implementations as shown, those harmonics can be or include the $5^{th}$, $7^{th}$, $11^{th}$, $13^{th}$, $17^{th}$, and $19^{th}$ harmonics, but it will be appreciated that other harmonics can be used in addition to or instead of those illustrated. According to aspects, a local gain value (k5, k7, etc.) can be set to 1 for each resonant regulator, the outputs of which are summed and coupled to a plant 204 having a characteristic function (1/(LS+R)). A current output is produced at 208, which is coupled to the set of resonant regulators 202 via a gain value 206 at a sum point 210.

In implementations, the overall system 200 allows for harmonic control of output current by tuning the gain value 206 (K). The chosen gain value 206 (K) will determine how fast the set of resonant regulators 202 will eliminate the harmonics in multiples of the fundamental frequency, for a given source current frequency. The source current frequency can, again, be selected in the range of 360-800 Hz, although other ranges can be used. In terms of damping effect, if the gain value 206 or K=½, then the harmonics will be eliminated in about two fundamental periods. According to aspects, in order to set the value of K, the root locus technique can be used to observe the closed loop poles of the overall system 200 as K is varies from zero to infinity (or an arbitrarily large number). The root locus behavior can be generated and/or observed using, for instance, conventional software applications which calculate and plot the poles of a transfer function behavior, as a function of gain or other variables. Values of K which target the desired source harmonics by creating a notch filter at those harmonic frequencies, as a function of current source frequency, can be selected.

Figure 3:
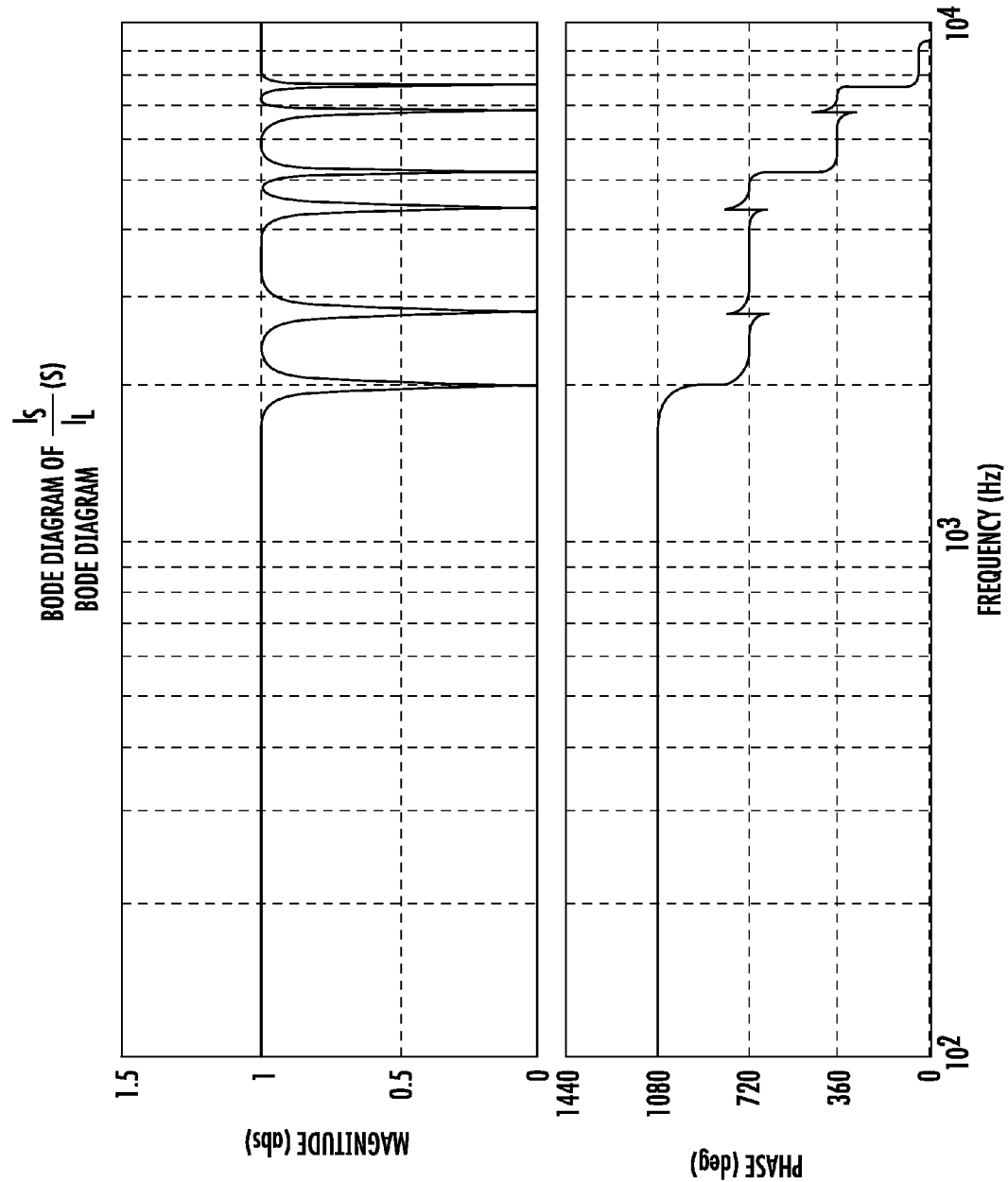
FIG. 3 illustrates a Bode diagram of certain output characteristics of systems and methods for tuning the control of a shunt active power filter over a variable frequency, according to various aspects.

As a result, and as for example shown in the Bode diagram of FIG. 3, a characteristic behavior of the source current (Is) divided by the load current (IL) as a complex function of (s) is achieved, in which that function exhibits notch filter behavior corresponding to selected harmonic frequencies (again, which can include odd harmonics such as the $5^{th}$, $7^{th}$, $11^{th}$, $13^{th}$, $17^{th}$ and $19^{th}$. Phase effects as shown are also produced The foregoing description is illustrative, and variations in configuration and implementation may occur to persons skilled in the art. As noted, while the set of resonant regulators 202 has been described in terms of a set of regulators tuned to the $5^{th}$, $7^{th}$, $11^{th}$, $13^{th}$, $17^{th}$ and $19^{th}$ harmonics, again other harmonics can be used instead of, or in addition to, those harmonics. For further example, while embodiments have been described in which one output voltage is produced, in implementations, multiple voltage outputs, which can be of different values, can be produced. Other resources described as singular or integrated can in embodiments be plural or distributed, and resources described as multiple or distributed can in embodiments be combined. The scope of the present teachings is accordingly intended to be limited only by the following claims.

What is claimed is:

1. A shunt active power filter system, comprising:
a first interface to a source power signal having a selectable frequency;
a set of resonant regulators coupled to the source power signal;
a second interface configured to couple an output power signal from the set of resonant regulators to a load;
a feedback loop having an input end coupled directly to the load indicating a selected frequency of the source power signal and an output end coupled directly an input of a gain tuning unit to be summed with a harmonic current ($I_h$), the feedback loop coupled between the source power signal and the set of resonant regulators, and the gain tuning unit disposed upstream from the resonant regulators and connected in series with the feedback loop and the load, the gain tuning unit generating a selectable gain value that is provided to the set of resonant regulators;
wherein the selectable gain value is selected to dampen a set of harmonics associated with the source power signal at the selected frequency of the source power signal indicated by the feedback loop based on a set of closed loop poles of the shunt active power filter system associated with the selected gain value.

2. The system of claim 1, wherein the source power signal comprises an alternating current signal.

3. The system of claim 2, wherein a frequency of the source power signal comprises a range of 360 to 800 Hz.

4. The system of claim 3, wherein the set of harmonics comprises at least a set of 5th, 7th, 11th, 13th, 17th, and 19th harmonics.

5. The system of claim 1, wherein the set of resonant regulators are connected in a parallel configuration.

6. The system of claim 1, wherein the load comprises a rectified load.

7. The system of claim 1, wherein the selectable gain value determines a rate of decay of the set of harmonics.

8. The system of claim 7, wherein the rate of decay is at least approximately equal to an inverse of the gain multiplied by a fundamental period of the source power signal.

9. A method of generating a power signal, comprising:
receiving a source power signal having a selectable frequency in a shunt active power filter;
coupling the source power signal to a set of resonant regulators;
coupling an output power signal from the set of resonant regulators to a load to generate a source current ($I_s$);
coupling the output power signal to the set of resonant regulators via a feedback loop having an input end coupled directly to the load to indicate a selected frequency of the source power signal and an output end coupled directly an input of a gain tuning unit to be summed with a harmonic current ($I_h$);
connecting a gain tuning unit upstream from the set of resonant regulators and in series with the feedback loop and the load, the gain tuning unit providing a selectable gain value to the set of resonant regulators;
selecting the frequency of the source power signal;
selecting the selectable gain value via the gain tuning unit to dampen a set of harmonics associated with the source power signal at the selected frequency indicated by the feedback loop based on a set of closed loop poles of the shunt active power filter associated with the selected gain value.

10. The method of claim 9, wherein the source power signal comprises an alternating current signal.

11. The method of claim 10, wherein a frequency of the source power signal comprises a range of 360 to 800 Hz.

12. The method of claim 11, wherein the set of harmonics comprises at least a set of 5th, 7th, 11th, 13th, 17th, and 19th harmonics.

13. The method of claim 9, wherein the set of resonant regulators are connected in a parallel configuration.

14. The method of claim 9, wherein the load comprises a rectified load.

15. The method of claim 9, wherein the selectable gain value determines a rate of decay of the set of harmonics.

16. The method of claim 15, wherein the rate of decay is at least approximately equal to an inverse of the gain multiplied by a fundamental period of the source power signal.

* * * * *